Patented Mar. 18, 1952

2,589,964

UNITED STATES PATENT OFFICE 2,589,964

MANUFACTURE OF TITANIUM PIGMENTS

James Thomson Richmond and Raymond James Wigginton, Luton, England, assignors to National Titanium Pigments Limited, Luton, England No Drawing. Application August 11, 1947, Serial No. 768,062. In Great Britain August 16, 1946

9 Claims. (Cl. 23—202)

Titanium dioxide pigments are usually prepared by the hydrolysis of a solution of titanium sulphate, and it is known that by conducting the hydrolysis with the addition of a suitably prepared nucleating agent the precipitate can be obtained in a form which yields a rutile pigment on calcination. Methods of preparing such a nucleating agent are described, for example, in the British specifications Nos. 533,227 and 566,499, which methods involve peptising or dispersing precipitated titanium dioxide by treatment with hydrochloric acid, the resulting nucleus liquid being added to the titanium sulphate solution which is to be hydrolysed.

The present invention provides an improved process for preparing a nucleus liquid in the presence of which titanium sulphate solutions can be hydrolysed to produce precipitates yielding rutile pigments on calcination. The rutile pigments obtained with the aid of such precipitates are of improved colour and higher tinting strength as compared with the products obtained by the process of specification No. 533,227, and as compared with the process of specification No. 566,499 the present process is simpler and yields products of higher tinting strength.

According to this invention, the nucleus liquid is prepared by treating a titanate of sodium, potassium, zinc or magnesium with a monobasic inorganic acid to produce a solution having a pH value below 1.5, diluting the resulting solution until it has a titanium content of 5–80 grams per litre (calculated as $TiO_2$) if its titanium content is not already within that range, and heating the solution at 50–100° C. for a period of 10 minutes to 2 hours to develop its nucleating properties while avoiding the precipitation of titanium dioxide from the solution. The expression "titanate" is used herein to denote a metatitanate or orthotitanate or a mixture of a metatitanate and an orthotitanate.

In one form of the process the metal titanate is treated with a hydrohalic acid, for example, hydrochloric acid, or with nitric acid in the case of a titanate of sodium or potassium, to produce a solution having a pH value below 1.5, and the resulting solution is diluted, when necessary, and heated as described above.

The titanate of sodium, potassium, zinc or magnesium may be prepared by causing titanium dioxide, which may be in the form of a hydrous precipitate or may have been calcined, to react with a compound, for example, an oxide, hydroxide or carbonate of sodium, potassium, zinc or magnesium in the relative proportions required to produce the metatitanate or orthotitanate or mixture of these titanates, that is to say in the proportion of 1 mol of titanium dioxide to 2 to 4 equivalents of the metal compound. In order to obtain the titanate in a form readily soluble in acid and in an otherwise advantageous condition for the purposes of the invention, a mixture of titanium dioxide and the metal compound in the appropriate relative proportions is heated at a temperature ranging from 200° C. to 800° C. for one to six hours.

In order to produce the solution having a pH value below 1.5 the metal titanate, after being ground, if this is required, is advantageously treated with a solution of nitric acid or of a hydrohalic acid of 10–36 per cent. strength in either case at such a temperature ranging from 20–60° C. and for such a period ranging from 1–10 hours that dissolution of the metal titanate is substantially complete, approximately 3–9 mols of the acid being required for each mol of the metal titanate. If the resulting solution does not already have a titanium content within the range of 5–80 grams per litre (calculated as $TiO_2$), it is diluted with water to bring its titanium content within that range, and advantageously within the range of 10–25 grams per litre (calculated as $TiO_2$). In order to develop its nucleating properties the solution is then heated at a temperature so selected with the range of 50–100° C. and for a period so selected within the range of 10 minutes to 2 hours that the precipitation of titanium dioxide from the solution is avoided.

The invention also includes the manufacture of rutile titanium dioxide pigments by hydrolysing a titanium sulphate solution in the presence of a nucleous liquid prepared as described above, and calcining the precipitate.

For the hydrolysis the nucleous liquid is advantageously used in a proportion (calculated as $TiO_2$) amounting to 1–15 per cent. of the titanium content (calculated as $TiO_2$) of the titanium sulphate solution to be hydrolysed. The hydrolysis may be conducted with the aid of heat in known manner. The titanium dioxide precipitates so obtained yield rutile pigments when calcined for 1½–2 hours at temperatures ranging from 750° C. to 950° C.

The titanium dioxide precipitates may, if desired, be calcined in the presence of an addition agent of the kind customarily used for improving the texture, colour or other pigmentary properties of the product, for example, a carbonate, sulphate, borate or phosphate of potassium or sodium or other known addition.

The following examples illustrate the invention:

Example 1

A titanium sulphate solution is prepared in the known manner by the sulphation of ilmenite, followed by reduction of ferric salts, and the removal of a part of the iron salts by crystallisation. A titanium dioxide precipitate is prepared from this solution by any well-known method, for example by the addition of alkali or by hydrolysis at a raised temperature with or without the addition of a nucleating agent. The resulting titanium dioxide is mixed as such, or after calcination, with a sodium hydroxide solution of 75 per cent. strength to form a stiff paste, the relative proportions of sodium hydroxide and titanium dioxide being such as to give a ratio of $Na_2O:TiO_2$ of 1:1. The paste is dried while keeping it in motion, and the dry powder is calcined at 600° C. for one hour.

The calcined sodium titanate is ground and treated with a quantity of hydrochloric acid of 10 per cent. strength amounting to 4 mols of HCl per mol of sodium titanate. The suspension is agitated for two hours at room temperature. The temperature is then raised to 50° C. in the course of a further half hour. The resulting solution, which is then substantially free from solids, is diluted with water until it has a titanium content of 10 grams per litre calculated as $TiO_2$. The solution is then heated for approximately 40 minutes at a temperature of 85° C.

The resulting nucleous liquid is then added to a titanium sulphate solution having the following composition:

| | Grams per litre |
|---|---|
| Total $TiO_2$ | 150.0 |
| Trivalent titanium (as $TiO_2$) | 2.0 |
| Ferrous iron | 21.6 |
| Total $SO_4$ (as $H_2SO_4$) | 327.0 | in a quantity such as to introduce 10 per cent. of $TiO_2$ calculated on the total $TiO_2$ content of the titanium sulphate solution. The mixture is raised to the boil in the course of 15 minutes and maintained at the boil for a further 30 minutes to complete the precipitation of the titanium dioxide. The precipitate is washed, and then calcined at 910° C. for 1½ hours. It is then ground to render it suitable for use as a pigment.

Pigments obtained in this manner consist completely of rutile and have tinting strengths 20–50 per cent. greater than that of conventional anatase pigments.

The procedure described in this example may be carried out with potassium titanate, instead of sodium titanate. For this purpose a potassium hydroxide solution of 75 per cent. strength is used, instead of the sodium hydroxide solution of 75 per cent. strength, the relative proportions of potassium hydroxide and titanium dioxide being such as to give a ratio of $K_2O:TiO_2$ of 1:1. In other respects the procedure is the same as that described in this example.

Example 2

A titanium dioxide precipitate is prepared from a titanium sulphate solution as described in the first paragraph of Example 1. The precipitate is then mixed with zinc oxide in the ratio of 1 mol of ZnO to 1 mol of $TiO_2$, and the mixture is calcined for six hours at 700° C. The resulting zinc titanate is then dissolved at 90° C. in a quantity of concentrated hydrochloric acid amounting to 6 mols of HCl to one mol of zinc titanate. The resulting solution is diluted with water to a $TiO_2$ content of 10 grams per litre, heated to 86° C. for 15 minutes, and added as a nucleus liquid to a titanium sulphate solution of the composition given in Example 1. The solution is then hydrolysed, and the precipitate further treated, as described in that example. In this manner pigments are also obtained which consist completely of rutile and have a tinting strength 20–50 per cent. greater than that of conventional anatase pigments.

Example 3

Magnesium orthotitanate is prepared by calcining an intimate mixture of 2 mols of magnesium carbonate ($MgCO_3$) and 1 mol of titanium dioxide at 700° C. for 1½ hours. The product, which is substantially free from uncombined magnesium carbonate, is mixed with hydrochloric acid of 36 per cent. strength in the proportion of 8 mols of HCl) per mol of magnesium orthotitanate. The temperature rises to 65° C., and the mixture is stirred for 3 hours, during which period the ortho-titanate is dissolved. The solution is then diluted with water to give it a titanium content of 10 grams per litre calculated as $TiO_2$, and the diluted solution is heated to 82° C. in the course of 10 minutes and maintained at that temperature for a further 15 minutes.

A titanium sulphate solution having the following composition:

| | Grams per litre |
|---|---|
| Total $TiO_2$ | 140 |
| Ferrous iron | 20.15 |
| Total $SO_4$ (as $H_2SO_4$) | 305 | is then added to the nucleus liquid, obtained as described above, in a quantity such that the $TiO_2$ in the nucleus liquid used amounts to 12 per cent. of the total $TiO_2$ content of the titanium sulphate solution. The mixture is raised to the boil in the course of 16 minutes and maintained at the boil for a further 30 minutes to give an efficiency of hydrolysis amounting to 95.4 per cent. The precipitate is washed, mixed with a quantity of potassium carbonate ($K_2CO_3$) amounting to 0.3 per cent of the $TiO_2$ content of the precipitate, and calcined at 910° C. for 1½ hours. A rutile pigment is obtained having a good colour and a tinting strength 35 per cent. higher than that of conventional anatase pigments.

Example 4

Sodium titanate (prepared by heating at 200° C. for 4 hours an intimate mixture of sodium hydroxide and non-calcined titanium dioxide in the molecular ratio $Na_2O:TiO_2$ of 1.05:1.0) is ground, and dissolved in hydrochloric acid of 10 per cent. strength in the manner described in Example 1, except that the relative proportions of acid to titanate are 4.5 mols of HCl per mol of titanate. The resulting titanate solution is diluted with water to give a titanium content of 10 grams per litre of $TiO_2$, and the diluted solution is heated at 83° C. for 15 minutes to develop the nucleating properties of the solution.

The resulting nucleus liquid is then added to a titanium sulphate solution having the following composition:

| | Grams per litre |
|---|---|
| Total $TiO_2$ | 140 |
| Ferrous iron | 20.15 |
| Total $SO_4$ (as $H_2SO_4$) | 305 | in a quantity such as to introduce 10 per cent. of $TiO_2$ calculated on the total $TiO_2$ content of the titanium sulphate solution. After bringing the mixture to the boil, it is maintained at the boil for 30 minutes in order to complete the precipitation. The precipitate so obtained is washed, and then calcined at 910° C. for 1½ hours to yield a rutile pigment of high tinting strength and good colour.

Example 5

1 mol of sodium titanate (prepared as described in Example 4) is slowly added to a quantity of nitric acid of 25 per cent strength amounting to 6 mols of $HNO_3$, care being taken to keep the temperature below 45° C. during the addition. The solution is then stirred for 3 hours and heated at 50° C. during the last ½ hour in order to bring about complete dissolution. The solution is then diluted with water to give it a $TiO_2$ content of 10 grams per litre, and the diluted solution is heated to 80° C. and maintained at that temperature for 10 minutes.

A titanium sulphate solution having the following composition:

| | Grams per litre |
|---|---|
| Total $TiO_2$ | 143 |
| Trivalent titanium (as $TiO_2$) | 6.5 |
| Ferrous iron | 21.3 |
| Total $SO_4$ (as $H_2SO_4$) | 317 | is then added to the nucleus liquid, obtained as described above, in a quantity such that the $TiO_2$ in the nucleus liquid used amounts to 8 per cent. of the total $TiO_2$ content of the titanium sulphate solution. The mixture is then boiled in the normal manner in order to complete the precipitation. The precipitate is washed, mixed with a quantity of potassium carbonate ($K_2CO_3$) amounting to 0.3 per cent. of the $TiO_2$ content of the precipitate, and calcined at 900° C. for 1½ hours to give a rutile pigment of high tinting strength.

Example 6

Sodium titanate is prepared by heating at 300° C. for 2 hours an intimate mixture of sodium hydroxide and precipitated titanium dioxide which has been previously calcined at 700° C. in order to remove moisture and sulphuric acid. The sodium hydroxide and titanium dioxide are present in the mixture in the molecular ratio $Na_2O:TiO_2$ of 1.05:1.0. The resulting titanate is ground and slowly added to a quantity of hydrochloric acid of 10 per cent. strength amounting to 4.6 mols of HCl per mol of sodium titanate, the temperature being kept below 45° C. The mixture is agitated until the titanate has substantially completely dissolved. The solution is then diluted until it has a titanium content of 25 grams per litre calculated as $TiO_2$. The diluted solution is heated to 84° C. in the course of 10 minutes, and maintained at that temperature for a further 10 minutes.

A titanium sulphate solution of the composition given in Example 3 is then added immediately to the nucleus liquid, obtained as described above, in a quantity such that the $TiO_2$ in the nucleus liquid used amounts to 10 per cent. of the total $TiO_2$ content of the titanium sulphate solution. The mixture is then raised to the boil in the course of 15 minutes, and maintained at the boil for a further 30 minutes to complete the precipitation of the titanium dioxide. The precipitate is washed, mixed with a quantity of sodium carbonate ($Na_2CO_3$) amounting to 0.2 per cent. of the $TiO_2$ content of the precipitate, and calcined at 890° C. for 1½ hours. A rutile pigment of high tinting strength and good texture is obtained.

We claim:

1. A process for the manufacture of a rutile titanium dioxide pigment, which comprises preparing a nucleating liquid containing nuclei of colloidal dimensions by dissolving a titanate of a metal selected from the group consisting of sodium, potassium, zinc and magnesium in a monobasic inorganic acid to produce a solution having a pH value below 1.5, diluting the resulting solution until it has a titanium content of 5–80 grams per litre (calculated as $TiO_2$) if its titanium content is not already within that range, and heating the solution at 50–100° C. for a period of 10 minutes to 2 hours to develop the colloidal nuclei while avoiding the precipitation of titanium dioxide from the solution, and thereafter hydrolyzing a titanium sulphate solution in the presence of the nucleating liquid so obtained, and calcining the resulting precipitate.

2. A process as claimed in claim 1, wherein the solution produced by dissolving the titanate in the acid is diluted until it has a titanium content of 10–25 grams per litre (calculated as $TiO_2$) if its titanium content is not already within that range.

3. A process as claimed in claim 1, wherein there is used a titanate which has been obtained by heating 1 mol of titanium dioxide with 2 to 4 equivalents of a compound of a metal selected from the group consisting of sodium, potassium, zinc and magnesium at a temperature ranging from 200° C. to 800° C. for one to six hours.

4. A process as claimed in claim 1, wherein the titanate solution is produced by treating 1 mol of the metal titanate with a quantity of a solution of the monobasic inorganic acid corresponding to 3–9 mols of the acid at such a temperature ranging from 20–60° C. and for such a period ranging from 1–10 hours that dissolution of the metal titanate is substantially complete.

5. A process as claimed in claim 1, wherein the nucleating liquid is prepared by dissolving a titanate of a metal selected from the group consisting of sodium and potassium in nitric acid to produce a solution having a pH value below 1.5, diluting the resulting solution until it has a titanium content of 5–80 grams per litre (calculated as $TiO_2$) if its titanium content is not already within that range, and heating the solution at 50–100° C. for a period of 10 minutes to 2 hours to develop the colloidal nuclei while avoiding the precipitation of titanium dioxide from the solution.

6. A process as claimed in claim 1, wherein the titanium sulphate is hydrolyzed in the presence of a proportion of the nucleating liquid (calculated as $TiO_2$) amounting to 1–15 per cent. of the titanium content (calculated as $TiO_2$) of the titanium sulphate solution.

7. A process as claimed in claim 1, wherein the precipitate is calcined for 1½–2 hours at a temperature ranging from 750° C. to 950° C.

8. A process as claimed in claim 1, wherein the nucleating liquid is prepared by dissolving a titanate of a metal selected from the group consisting of sodium, potassium, zinc and magnesium in a hydrohalic acid to produce a solution having a pH value below 1.5, diluting the resulting solution until it has a titanium content of 5–80 grams per litre (calculated as $TiO_2$) if its titanium content is not already within that range, and heating the solution at 50–100° C. for a period of 10 minutes to 2 hours to develop the colloidal nuclei while avoiding the precipitation of titanium dioxide from the solution.

9. A process as claimed in claim 8, wherein a hydrochloric acid solution of 10-36 per cent. strength is used as the hydrohalic acid.

JAMES THOMSON RICHMOND.
RAYMOND JAMES WIGGINTON.

REFERENCES CITED

The following references are of record in the file of this patent:

UNITED STATES PATENTS

| Number | Name | Date |
|---|---|---|
| 2,062,133 | Kubelka | Nov. 24, 1936 |
| 2,389,026 | Cauwenberg | Nov. 13, 1945 |
| 2,427,165 | Tanner et al. | Sept. 9, 1947 |
| 2,433,597 | Cauwenberg | Dec. 30, 1947 |
| 2,488,755 | Aagard | Nov. 22, 1949 |

OTHER REFERENCES

McPherson and Henderson, A Course in General Chemistry, third ed., pp. 418 to 420. Ginn & Co., N. Y.